United States Patent [19]
Wittko et al.

[11] 3,966,147
[45] June 29, 1976

[54] HAMMOCK SUPPORTED FUEL TANK

[75] Inventors: Joseph N. Wittko, Old Westbury, N.Y.; David G. Harding, Brookhaven, Pa.; John J. Schneider, Media, Pa.; Joseph E. Gonsalves, Springfield, Pa.

[73] Assignees: Grumman Aerospace Corporation, Bethpage, N.Y.; The Boeing Company, Seattle, Wash.

[22] Filed: Nov. 26, 1974

[21] Appl. No.: 527,338

[52] U.S. Cl. .............................. 244/135 B; 150/.5; 248/311.1
[51] Int. Cl.² ......................................... B64D 37/04
[58] Field of Search ......... 244/135 R, 135 B, 17.11, 244/137 R, 136; 280/5 H; 248/311; 150/.5, DIG. 1; 206/.6

[56] References Cited
UNITED STATES PATENTS

| | | |
|---|---|---|
| 1,976,456 | 10/1934 | Noonan .......................... 244/135 R |
| 2,754,992 | 7/1956 | Wilson ............................ 244/135 B |
| 3,101,921 | 8/1963 | Price ............................... 244/135 B |
| 3,380,691 | 4/1968 | McComas .................... 244/135 R X |

*Primary Examiner*—Trygve M. Blix
*Assistant Examiner*—Barry L. Kelmachter

[57] ABSTRACT

An externally located crashworthy self-sealing fuel tank for use in combination with military aircraft is provided. The tank, having a cross-sectional shape with a substantially flat top and a shallow catenary extending below the flat top, is suspended within a hammock which is connected to the underside of the aircraft. This installation eliminates the normal surrounding structure which would tend to tumble incoming projectiles and increase the severity of tank wounds, minimizes the damaging effect of hydraulic ram upon the aircraft structure and minimizes hazards of explosions or fires by eliminating voids or cavities adjacent to the fuel tank.

3 Claims, 7 Drawing Figures

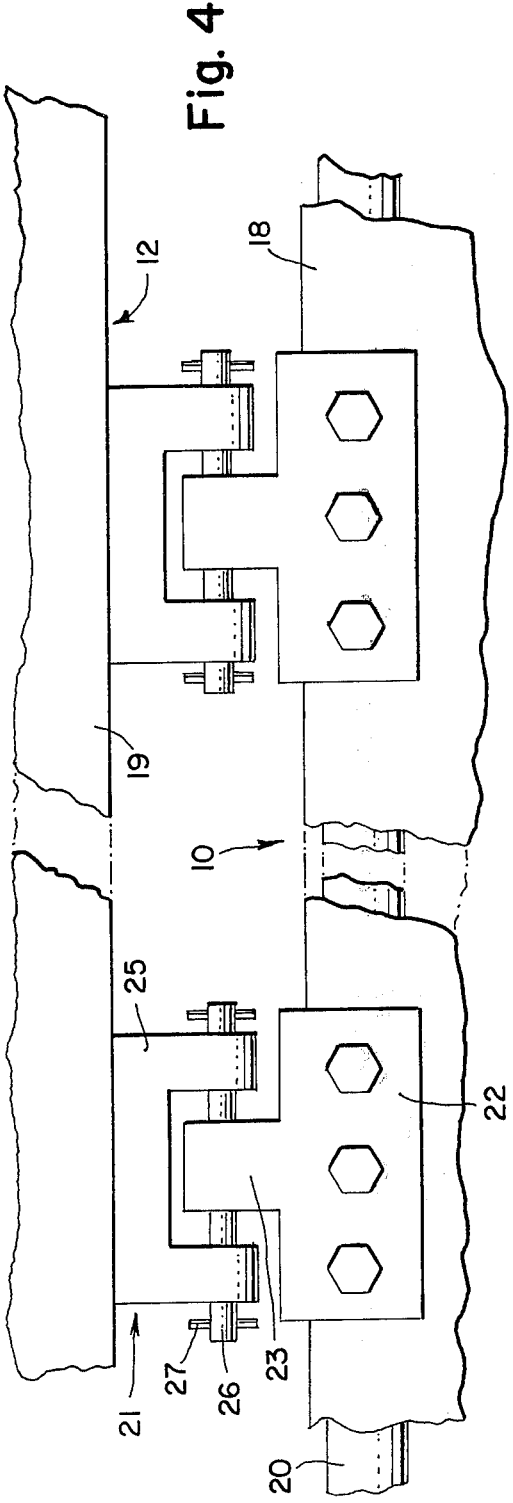
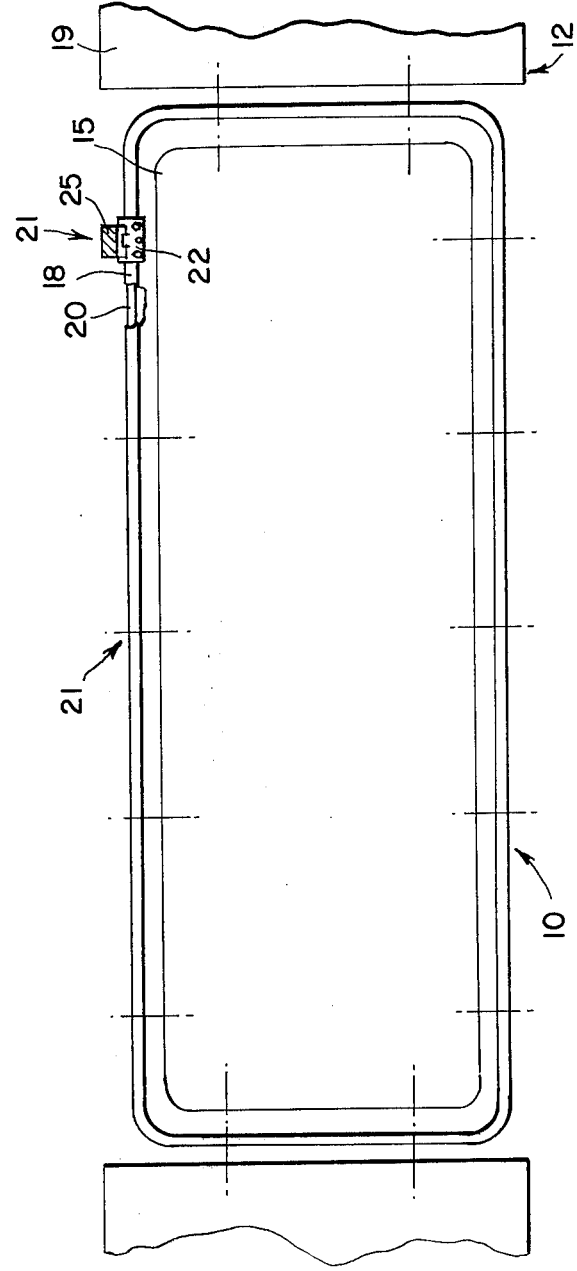

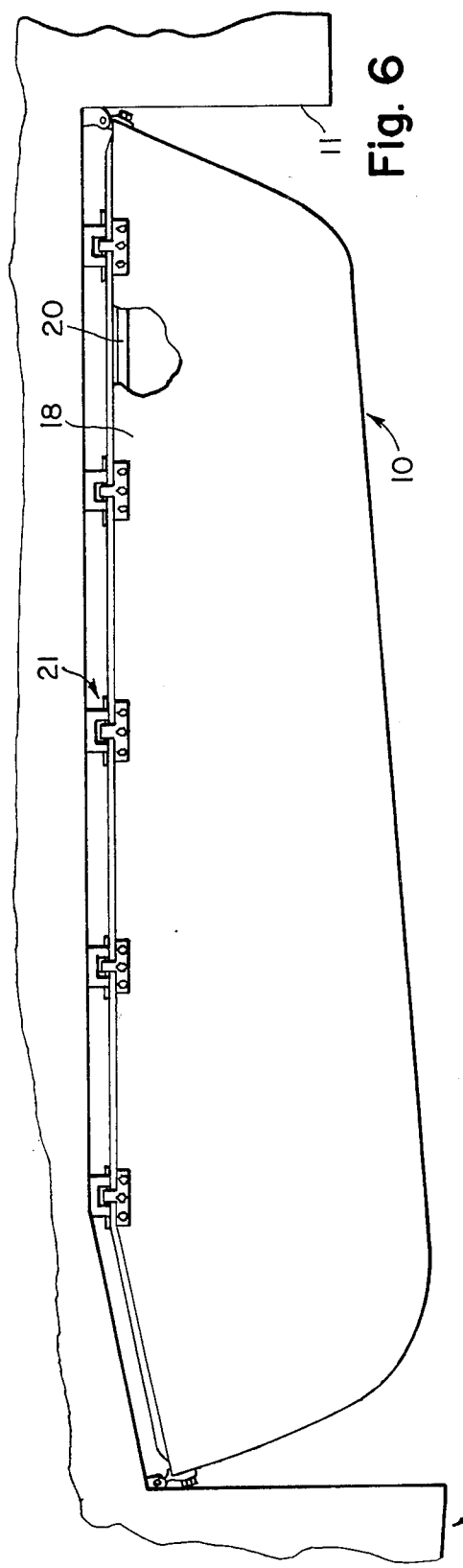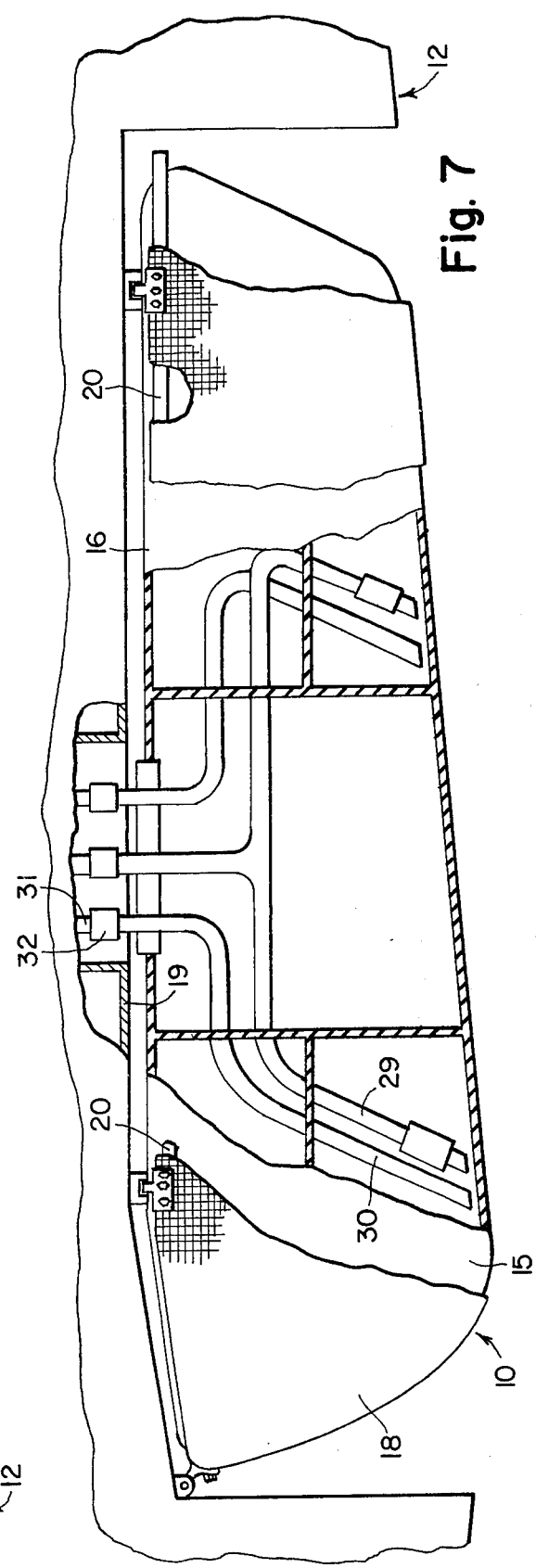

HAMMOCK SUPPORTED FUEL TANK

FIELD OF THE INVENTION

The present invention relates to aircraft fuel tanks and has particular reference to external fuel tanks for helicopters.

SUMMARY OF THE PRESENT INVENTION

Conventional self-sealing fuel tanks are installed in the interior of military aircraft and depend upon the surrounding structure and backing board for support and self-sealing capability. Unfortunately the surrounding structure, rather than protecting the tank, causes projectiles to tumble before reaching the fuel tank, thereby contributing to the severity of the damage. Tumbling causes the projectile to puncture a greater sized hole in the fuel tank. Additionally, the tumbling action increases the effects of hydraulic ram which is present whether or not there is tumbling.

Hydraulic ram can cause severe damage to the aircraft structure surrounding the fuel tank in addition to damaging the tank itself. This phenomenon results in large forces being generated at unpredictable locations on the surface of the tank. These forces are a direct result of the pressure waves generated by the projectile passing through the fuel. Although this phenomenon is always present under such circumstances, the forces are intensified when the flexible material of the self-sealing tank is inhibited from deflecting and when the projectile tumbles. The supporting structure for the self-sealing fuel tanks located within conventional aircraft provide such an inhibiting effect. Since the conventional fuel tanks are located within the aircraft, leaking fuel and fumes may collect within the aircraft structure, thereby causing an obvious safety hazard.

An additional problem associated with internal fuel tanks in military aircraft has been the difficulty in repairing or replacing such tanks. An externally located fuel tank requires considerably less maintenance time and results in less aircraft down time. Furthermore, conventional internally supported tanks are fixed volume by nature and cannot be replaced by larger tanks for longer flight periods.

The present invention is an improved fuel tank in which the fuel is stored in a crashworthy, self-sealing cell supported externally of the aircraft in a tightly fitting, contoured hammock. The fuel cell is an elongated, flexible, rubberized container, with a cross-section having a substantially flat top and a shallow catenary-shaped bottom and sides below the flat top. The external fuel cell is nested into a tire-cord hammock which is hung from the structure along its upper periphery by a supporting bar and hinge arrangement. A bar-like frame (which may be molded into the periphery of the hammock) is fitted with a plurality of hinge members along the entire length of the frame. These hinge members are pinned to cooperating anchors which are secured to the aircraft structure to thereby support the bar, hammock, and cell. The hammock, preferably constructed with alternately biased layers of tire cord, enhances the puncture-resistant quality inherent in a crashworthy fuel cell and augments the tank's self-sealing capability by essentially performing the same function as a backing board. The hammock does not cause the projectiles to tumble and, therefore, keeps damage from a projectile to a minimum. Since the hammock is inherently flexible, thus minimizing the effects of hydraulic ram, this results in increased fuel tank reliability and the avoidance of the explosive-like damage to aircraft structure caused by hydraulic ram. Furthermore, the shallow catenary shape of the tank attenuates the effects of hydraulic ram. In the event a leak does occur in the self-sealing fuel tank, there is no aircraft structure for leaking fuel and fumes to collect in, thereby avoiding the likelihood for explosion or fire.

The construction described provides versatility in flight operations and easy maintainability. Removal of the cell for replacement or maintenance is conveniently done by removing the pins from all hinges, except those along one side of the supporting bar and permitting the hammock to swing down on those hinges. Additionally, the fuel capacity can be increased to match the requirements for longer flight times or different missions merely by installing a larger fuel tank assembly without redesigning external structure.

It is, therefore, an object of the present invention to provide a new and improved fuel tank installation which will not cause incoming projectiles to tumble.

It is a further object of the invention to provide a new and improved fuel tank wherein surrounding collection regions for fuel are eliminated in the event leaks occur in the fuel tank.

It is a still further object of the present invention to provide an externally located self-sealing fuel tank which is suspended from the underside of an aircraft fuselage.

It is still an additional object of the present invention to provide connecting means for an externally located self-sealing aircraft fuel tank which will connect the tank to the aircraft.

It is a further object of the invention to provide a new and improved fuel tank for aircraft which is externally located.

BRIEF DESCRIPTION OF THE DRAWINGS

For a more complete description of the inventions, reference may be made to the accompanying drawings, in which FIG. 4 is a detail of the hinge-supporting device, FIG. 5 is a partial top view of the fuel tank, FIG. 6 is an external side view of the fuel tank, FIG. 7 is a cutaway side view of the tank illustrating the internal construction of the tank.

DESCRIPTION OF THE PREFERRED EMBODIMENTS

Figure 1:
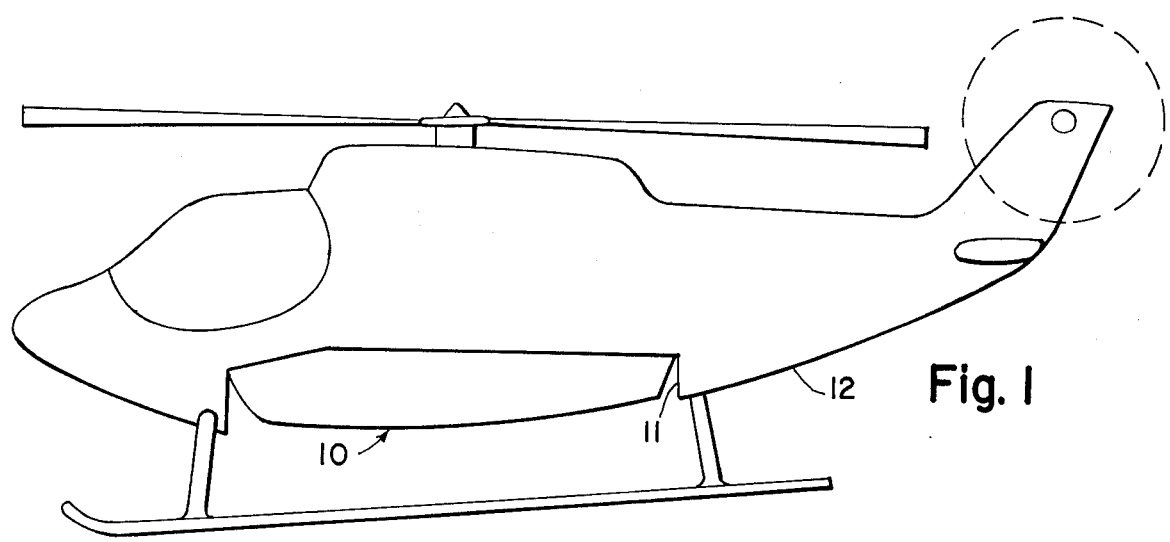
- FIG. 1 is illustrative of the placement of the external fuel tank on a helicopter.

With reference to FIG. 1 of the drawings, there is shown the preferred placement of the fuel tank assembly 10 within a notched space 11 on the underside of the aircraft or helicopter 12. In this arrangement, the sides of the tank are not covered by any aircraft structure nor does the tank extend substantially below the lower contour of the helicopter. The absence of aircraft structure is advantageous from the viewpoint of preserving the self-sealing capability of the tank since any projectile piercing the tank would not have been tumbled and the resulting wound would be smaller and more easily sealed and repaired.

Figure 2:
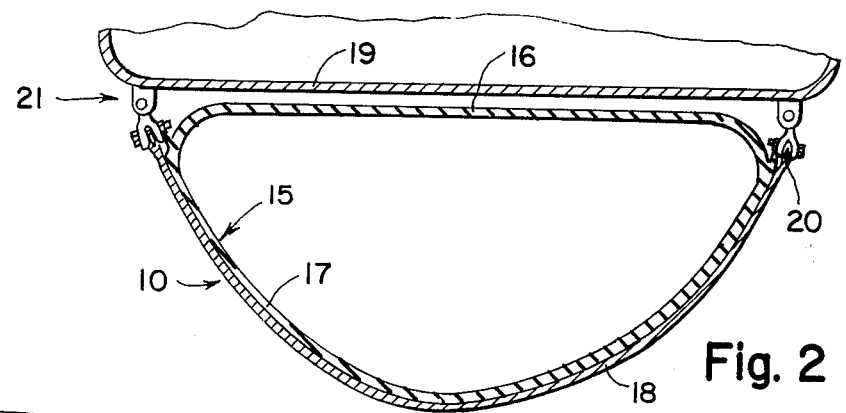
FIG. 2 is a cross-section of the fuel tank.

FIG. 2 shows a cross-section of the fuel tank assembly 10 in position with respect to the aircraft 12. The underside of the aircraft fuselage is depicted in the drawings as being flat. It is to be understood, however, that the fuel tank and support structure of the present invention may be used with equally beneficial results in combination with aircraft fuselages having a curved cross-sectional shape. The rubber, crash-worthy, self-sealing fuel cell 15 is made of any one of a number of well known self-sealing materials.

The fuel cell 15 has a flat top 16 and a lower portion 17. The cross-sectional shape of the lower portion 17 may be loosely described as that of a catenary. In fact, the actual shape of the lower portion 17 will vary depending upon the amount of fuel in the tank at any given point in time. Accordingly, it is to be understood that although the term catenary is used to describe the shape of the lower portion 17, the tank strictly speaking, will not always be a perfect catenary.

Figure 3:
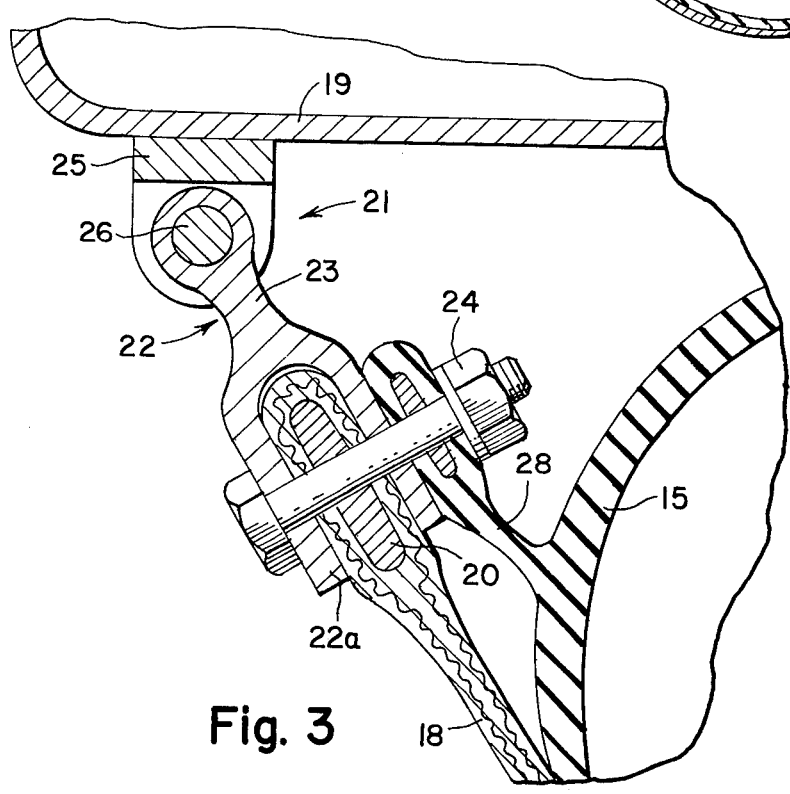
FIG. 3 is a detail of a portion of FIG. 2.

The cell 15 is nested in a close-fitting, tire-cord fabric hammock 18, which is in turn suspended from the aircraft structure 19 on a supporting bar 20 and hinge assembly 21. Preferably, the supporting bar 20 is buried in or covered by the edge of the hammock 18 as may be done by molding the edge of the hammock over the bar 20, for example, or by any other suitable means. A typical hinge assembly 21 is shown in detail in FIGS. 3 and 4. The movable hinge member 22 is provided with a deep channel 22a into which the bar 20 and the edge of the hammock 18 are inserted and held in place therein by bolt 24 and nut 24a for example. The projecting finger 23 of member 22 is inserted into a fixed hinge block 25, which is attached to the aircraft or helicopter frame 19, and is held firmly in block 25 by hinge pin 26 about which the finger 23 can pivot. Pin 26 may be held in place by any suitable means providing for easy removal, such as retaining pins 27, for example.

The top of the rubber tank 15 additionally may be supported against collapse by an external protrusion 28 on tank 15, which encircles the upper region of the tank 15 and which is also attached to member 22 by the bolt 24.

The bar 20 which completely encircles the tank is in the nature of a frame as shown in FIG. 5, a top view of the assembly, and FIG. 6, a side view thereof. In FIGS. 5 and 6, the hammock 18 is shown partially cut away to reveal the bar 20. As shown in these figures, the bar 20 is supported by a number of hinges along each side of the bar 20 with additional supports on the ends. Fourteen supports are shown in FIGS. 5 and 6, but no significance should be read into that number, and in reality, the quantity would be considerably more. The number provided must be sufficient to hold the tank 10 securely under military operating conditions.

It will be seen that maintenance of the tank 10 which may require exposure of the cell 15 can be accomplished after removing the hinge pins 26 along one side and both ends of the frame 20 and lowering that side while the bar or frame 20 hangs on the hinges on the opposite side thereof. Furthermore, if a completely different tank 10 of greater or smaller capacity is required for a specific operation, it is a simple matter to remove all pins 26 (or hinges 22) holding the hammock 18 in place and substitute a completely new assembly of cell, hammock, and supporting bar.

It will be realized that the hinge members 22 can be relatively long with a plurality of projections 23 thereon and are not necessarily individual pieces. In fact, it is possible to have all projections 23 on a unitary frame, if desired, wherein the frame would in effect be the supporting bar.

FIG. 7, cutaway view, shows the interior of the cell 15 which must contain the usual feed 29 and vent lines 30 for the fuel. The inner plumbing which forms no part of the present invention but is shown for completeness only, is connected to the appropriate lines 31 on the aircraft proper by easily connectable fittings 32 such as quick-disconnect couplings and/or flexible lines for example. The connections of the internal lines to the aircraft lines may help to support the top of the cell 15.

Referring now to FIG. 2, the lower section 17 of the cell 15 was described as being catenary. It is preferable that the catenary be one described as shallow, rather than deep. The shallow catenary provides a reduced ram effect from projectiles by dissipating the energy over the surface of the fuel, thereby minimizing tank damage. In the deep catenary tank the shock waves may be magnified and the projectile might penetrate both walls of the tank. A deep catenary tank is one in which the tank assumes a "tear drop" shape when filled with fuel.

When the fuel tank 10 is full, as at the beginning of a mission, the upper portion 16 of the cell 15 may come into physical contact with the underside of the fuselage 19. This contact could intensify the effects of hydraulic ram were the tanks to receive a ballistic impact. As a practical matter the aircraft would use sufficient fuel before reaching a combat area to eliminate the contact between the upper surface 16 of the cell 15 and the fuselage 19.

The invention having been described with reference to specific examples, should not be limited by the description since many variations and modifications are possible, but should be limited only by the terms of the appended claims.

What we claim is:

1. In an aircraft, a fuel cell fabricated of self-sealing material having:
    a substantially flat top surface for nesting under and against a substantially flat external bottom surface of the aircraft and having sides and a bottom shaped in the form of a shallow catenary, and
    means for supporting the fuel cell comprising:
        a bar member extending the length of the fuel cell on both sides thereof and extending across the front and rear of the fuel cell,
        hinge means for releasably attaching said bar member to the bottom surface of the aircraft,
        means provided on said bar member for securing thereto the fuel cell, and
        a fabric hammock attached to said bar member, said hammock engaging about and conforming to the shape of said fuel cell to confine and support it from said bar member.

2. In an aircraft, an external elongate horizontally disposed fuel tank shaped in cross section in the form of a shallow catenary having a flat top surface, the tank being formed of pliable material, and means for supporting said fuel tank comprising:
    a bar member extending around the periphery of the top surface of the tank, and
    a fabric cradle attached to said member and depending therefrom, the cradle engaging about and conforming with the sides, bottom and ends of the tank to support the same from the member.

3. In an aircraft, an external fuel tank fabricated of self-sealing material and being shaped in cross section, originally and throughout its use, in the form of a shallow catenary having a flat top surface, and means for supporting said tank comprising:
- a bar member extending around the entire periphery of the top surface of the tank,
- a fabric hammock secured to the bar member and enclosing the tank,
- the hammock conforming to the side, end and bottom surfaces of the tank to support the tank from the bar member, and
- means for releasably attaching the bar member to supporting structure.

* * * * *